United States Patent [19]

Furumoto et al.

[11] Patent Number: 4,646,520
[45] Date of Patent: Mar. 3, 1987

[54] TORQUE FLUCTUATION ABSORBER BETWEEN A FLYWHEEL AND A STEPLESS HYDRAULIC TRANSMISSION

[75] Inventors: Mitsumasa Furumoto, Kamifukuoka; Kouji Yamaguchi; Eiichiro Kawahara, both of Tokorozawa; Kenichi Ikejiri, Kawagoe, all of Japan

[73] Assignee: Honda Giken Kogyo Kabushiki Kaisha, Tokyo, Japan

[21] Appl. No.: 716,906

[22] Filed: Mar. 28, 1985

[30] Foreign Application Priority Data

Mar. 29, 1984 [JP] Japan .................................. 59-61870
Mar. 29, 1984 [JP] Japan .................................. 59-61871

[51] Int. Cl.$^4$ ............................................. F16D 31/02
[52] U.S. Cl. ........................................... 60/469; 60/487
[58] Field of Search ..................... 60/469, 338, 487

[56] References Cited

U.S. PATENT DOCUMENTS

| | | | |
|---|---|---|---|
| 3,354,637 | 11/1967 | Croswhite | 60/489 |
| 3,902,567 | 9/1975 | Pekar, Jr. | 60/469 |
| 4,111,003 | 9/1978 | Bolinger et al. | 60/469 |
| 4,143,561 | 3/1979 | Melhorn | 60/338 |

FOREIGN PATENT DOCUMENTS 511531 1/1955 Italy ...................................... 60/338
55-152952 11/1980 Japan .

*Primary Examiner*—Edward K. Look
*Attorney, Agent, or Firm*—Armstrong, Nikaido, Marmelstein & Kubovcik

[57] ABSTRACT

In a hydraulic transmission comprising: an input shaft connected to a flywheel of a crankshaft of an engine through a rotary container of a centrifugal oil filter; and an oil supply pump adapted to be driven by the input shaft, wherein the rotary container has its inside communicating at one side with a discharge port of the supply pump and at the other with a transmission oil circuit, a shock absorbing system characterized: in that a torque absorbing member is interposed between the rotary container connected to the input shaft and a thrust plate fitted rotatably on the outer circumference of the container, the torque absorbing member being adapted to be deformed in response to the relative rotations of the two; and in that the thrust plate is connected the flywheel.

1 Claim, 4 Drawing Figures

4,646,520

TORQUE FLUCTUATION ABSORBER BETWEEN A FLYWHEEL AND A STEPLESS HYDRAULIC TRANSMISSION

BACKGROUND OF THE INVENTION

The present invention relates to a shock absorbing system for a hydraulic transmission and, more particularly, a shock absorbing system for preventing torque fluctuations between the flywheel of the engine and the input shaft of the transmission from being transmitted to each other.

A hydraulic transmission having input shaft connected to a flywheel of an engine through the rotary container of a centrifugal oil filter, has been proposed and disclosed by the present applicant in Japanese patent application laid-Open No. 55-152952. An oil supply pump is driven by the input shaft. The inside of the rotary container communicates at one side with the discharge of the pump and at the other side with a transmission oil circuit. Since, in this structure, the input shaft is connected integrally to the flywheel of the engine, it has been found that torque fluctuations, if any, between the engine and the transmission are transmitted directly to each other to cause vibrations.

OBJECTS AND SUMMARY OF THE INVENTION

Therefore, the present invention has an object to provide a simple but effective shock absorbing system which can absorb the torque fluctuations between the engine and the transmission by making use of the rotary container of the centrifugal oil filter as a component.

In order to achieve this object, the present invention is characterized: in that there is interposed between said rotary container connected to said input shaft and a thrust plate fitted rotatably on the outer circumference of said container, a torque absorbing member which is adapted to be deformed in response to the relative rotations of the two; and in that said thrust plate is connected to said flywheel.

DETAILED DESCRIPTION OF THE INVENTION

Figure 1:
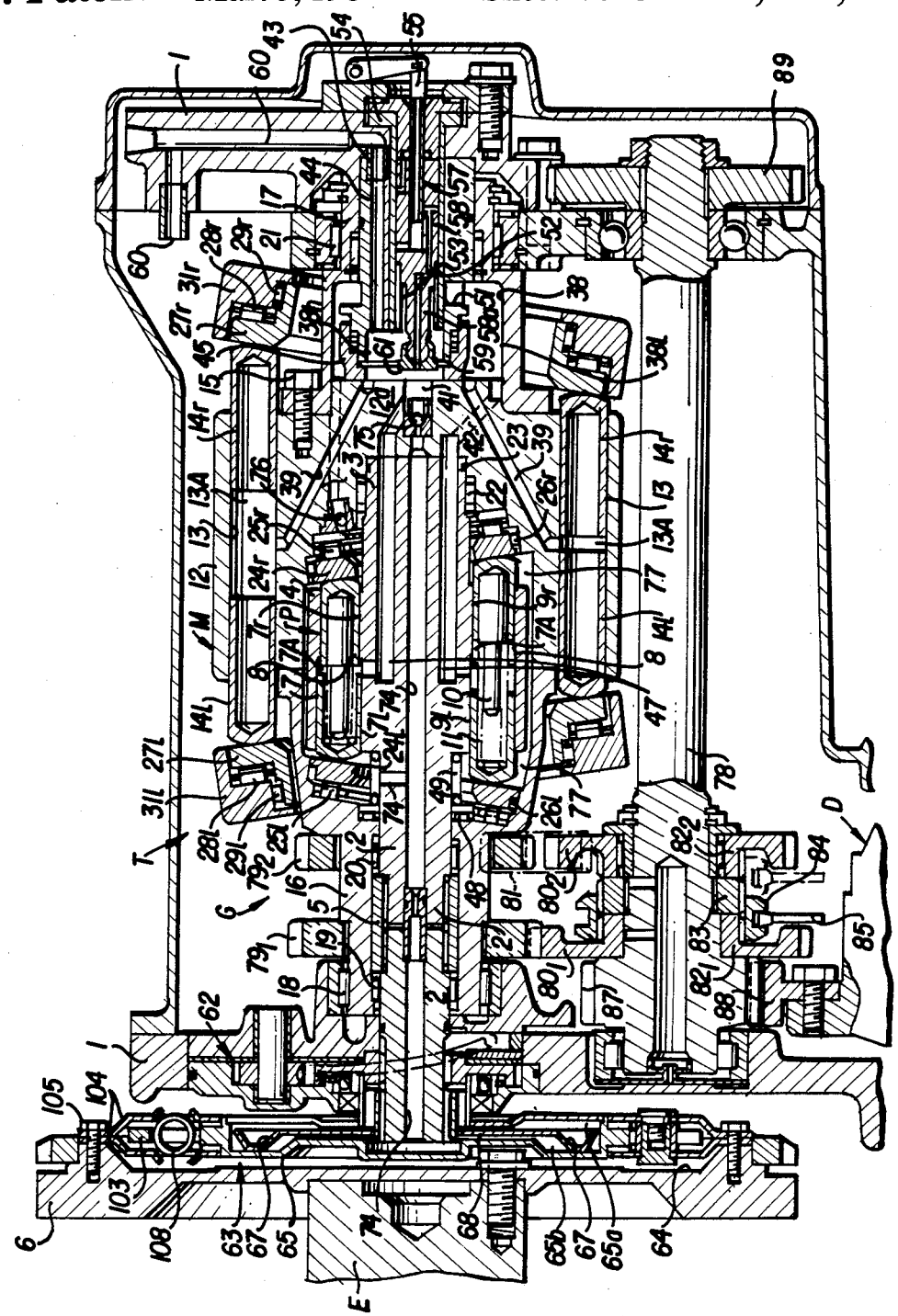
FIG. 1 is a longitudinally sectional side elevation showing an automotive transmission including the present invention.

The present invention will be described in the following in connection with one embodiment thereof with reference to the accompanying drawings. An automotive power transmission is constructed, as shown in FIG. 1, of: a hydraulic transmission T, which is adapted to be driven by a crankshaft E of an engine; and a forward and reverse gear mechanism G which connects that transmission T and a differential gear mechanism D. All of these components are accommodated in a transmission case 1.

First of all, the hydraulic transmission T will be described in the following. This hydraulic transmission T is constructed of a slant plate hydraulic pump P of constant capacity type and a slant plate hydraulic motor M of variable capacity type.

The hydraulic pump P is equipped with a pump cylinder 4 having an input shaft 2 extending to the left end and a support shaft 3 extending to the right end. The input shaft 2 is divided at its center into two halves, which are so connected to each other through a spline sleeve 5 that they can move axially relative to each other. Moreover, the input shaft 2 has its leading end protruding through the left side wall of the transmission case 1 to the outside, where is connected to a fly wheel 6 attached to the crankshaft E of the engine.

The pump cylinder 4 is formed with a number of stepped cylinder bores 7, 7 extending therethrough which are arranged in an annular form surrounding the center of rotation of the cylinder 4. In the embodiment, as shown, each stepped cylinder bore 7 has its left half enlarged at 7$l$ and its right half at 7$r$ to form a pressure face 8 at the stepped portion. In each stepped cylinder bore 7, there is fitted slidably a pair of larger and smaller pump plungers 9$l$ and 9$r$ which are opposed to each other to define a pump oil chamber 7A in between. Both plunger 9$l$ and 9$r$ are formed as a hollow cylindrical shape with one end closed having the closed ends positioned at the outer ends. In the hollow portion of the larger pump plunger 9$l$, there is housed a coil spring 11 for urging the two plungers 9$l$ and 9$r$ apart from each other. In the hollow portion of the smaller pump plunger 9$r$, there is fitted the base of a spring guide rod 10 which is inserted into the spring 11 for preventing it from buckling. The spring guide rod 10 is made of a material having a smaller specific gravity than that of the pump plungers 9$l$ and 9$r$.

The hydraulic motor M is equipped with a motor cylinder 12 which concentrically encloses the pump cylinder 4. The motor cylinder 12 is formed with a number of cylinder bores 13, 13 and 13 extended therethrough which are arranged in annular form surrounding the center of rotation of the cylinder 12. The motor cylinder 12 is formed integrally with a distributor end wall 12$a$ at its right end. In each of the bores 13, there are fitted slidably a pair of motor plungers 14$l$ and 14$r$ of an equal diameter, which are opposed to each other to define a motor oil chamber 13A in between. A hollow output shaft 16 and a hollow support shaft 17 are fastened by bolts 15 to the left and right end faces of the motor cylinder 12, respectively. The outer circumference of the output shaft 16 is supported on the transmission case 1 through a bearing 18. The input shaft 2 is supported on the inner circumference of output shaft 16 through bearings 19 and 20. The support shaft 17 has its outer circumference supported on the transmission case 1 through a bearing 21. The motor cylinder 12 has its inner side supporting the support shaft 3 of the pump cylinder 4 through a bearing 22 to hold the end face of the support shaft 3 and the distributor end wall 12$a$ in contact with each other. On the outer circumference of the end portion of the support shaft 3, there is fitted a seal ring 23 which contacts with the inner circumference of the motor cylinder 12.

A pair of left and right pump slant plates 24$l$ and 24' are supported on the inner side of the motor cylinder 12, through thrust and radial bearings 25$l$ and 23$l$; and 25$r$ and 26$r$. The pair of right and left pump slant plates 24$l$ and 24$r$ are arranged symmetrically with each other and are in abutment against the respective outer ends of the left group of the pump plungers 9$l$ and the right group of the pump plungers 9$r$ at predetermined angles of inclination with respect the axis thereof. Thus, the respective pump slant plates 24*l* and 24*r* are operatively associated with the aforementioned coil spring 11, when they rotate relative to the motor cylinder 12, to reciprocate the respective groups of the pump plungers 9*l* and 9*r* thereby to repeat suction and discharge strokes.

In the hydraulic motor M, there are symmetrically arranged a pair of right and left motor slant plates 27*l* and 27*r* which are in abutment against the respective outer ends of the left group of the motor plungers 14*l* and the right group of the motor plungers 14*r* with respect to the axis thereof. These motor slant plates 27*l* and 27*r* are supported through thrust and radial bearings 28*l* and 28*l;* and 28*r* and 29*r*, respectively, by slant plate frames 31*l* and 31*r*. These slant plate frames 31*l* and 31*r* are equipped integrally with trunnion shafts (although not shown) which have an axis perpendicular to the axis of rotation of the motor cylinder 12, respectively. These trunnion shafts are supported rotatably on the transmission case 1 and are connected coactively to each other through an associating mechanism (although not shown). The two motor slant plates 27*l* and 27*r* can be inclined symmetrically by the action of the aforementioned associating mechanism from the upright positions, in which they are perpendicular to the respective groups of the motor plungers 14*l* and 14*r*, to the most inclined positions, as shown. When the motor cylinder 12 rotates at those inclined positions, the two motor slant plates 27*l* and 27*r* can consecutively reciprocate the respective groups of the motor plungers 14*l* and 14*r* to repeat expansion and compression strokes. The sliding strokes of those plungers 14*l* and 14*r* are determined by the angles of inclination of the motor slant plates 27*l* and 27*r*.

A hydraulic closed circuit is provided in the following between the hydraulic pump P and the hydraulic motor M. Specifically, the support shaft 17 of the motor cylinder 12 is formed with an oil chamber 38 facing the distributor end wall 12*a*. In the oil chamber 38, there are opened not only a number of communication ports 39, 39 and so on, which are respectively formed in the distributor end wall 12*a*, but also one discharge port 41 and one suction port 42. The discharge port 41 has its open end positioned on the center line of rotation of the motor cylinder 12; the communication ports 39, 39 and so on have their open ends positioned in a common circle enclosing the discharge port 41., and the suction port 42 is positioned outside of the grouped communication ports 39. A fixed shaft 44, which is positioned and fixed in the transmission case 1 through a positioning pin 43, protrudes from the outer end of the support shaft 17 into the oil chamber 38. A distributor ring 45 is attached to that protruding end such that it is eccentric to a predetermined extent with respect to the center of rotation of the motor cylinder 12. The distributor ring 45 contacts the distributor end wall 12*a* and partitions the oil chamber 38 into an inner, high-pressure oil chamber 38*h* and an outer, low-pressure oil chamber 38*l*. The high-pressure oil chamber 38*h* provides communication between the aforementioned discharge port 41 and the communication ports 39 leading to a motor oil chamber 13A in an expansion stroke, whereas the low-pressure chamber 38*l* provides communication between the suction port 42 and the communication ports 39 leading to the motor oil chamber 13A in a compression stroke. In the end face of the support shaft 3 of the pump cylinder 4 abutting against the distributor end wall 12*a*, there are opened a number of communication ports 47, 47 and so on which lead to the respective pump oil chambers 7A. Of those communication ports 47, those leading to the pump oil chamber 7A in a discharge stroke are made to communicate with the aforementioned discharge port 41 whereas those leading to the pump oil chamber 7A in a suction stroke are made to communicate with the aforementioned suction port 42.

Thus, when the pump cylinder 4 is rotated by the input shaft 2 by the rotations of the crankshaft E of the engine, the oil under a high pressure established in the pump oil chamber 7A as a result of a discharge stroke of the pump plungers 9*l* and 9*r* flows from the discharge port 41 to the high-pressure oil chamber 38*h* and further through the communication ports 39 communicating therewith to the motor oil chamber 13A in an expansion stroke to thrust apart the opposed plungers 14*l* and 14 facing that oil chamber. The working oil, which is discharged from the motor plungers 14*l* and 14*r* in a compression stroke returns to the pump oil chamber 7A in a suction stroke through both the communication ports 39 and the suction port 42, which communicate with the low-pressure oil chamber 38*l*. The motor cylinder 12 is rotated to output its rotations to the output shaft 16 by the sum of a reactive torque, which is applied through the pump slant plates 24*l* and 24*r* to the motor cylinder 12 by the pump plungers 9*l* and 9*r* in the discharge stroke, and a reactive torque which is received from the motor slant plates 27*l* and 27*r* by the motor plungers 14*l* and 14*r* in the expansion stroke.

In this case, the transmission ratio of the motor cylinder 12 to the pump cylinder 4 is given by the following equation:

Transmission ratio = (Number of revolution of pump cylinder 4) (Number of revolution of motor cylinder 12) = 1 + (Capacity of hydraulic motor M) / (Capacity of hydraulic pump P)

As can be seen from the above equation, by changing the capacity of the hydraulic motor M from zero to the maximum, it is possible to change the transmission ratio from 1 to a desired value. Since the capacity of the hydraulic motor M is determined by the strokes of the opposed motor plungers 14*l* and 14*r*, the aforementioned transmission ratio can be continuously adjusted by inclining the two motor slant plates 27*l* and 27*r* from the upright positions to the maximum angle, as has been described above.

Upon transmission, the strokes of the opposed motor plungers 14*l* and 14*r* are controlled simultaneously by the paired motor slant plates 27*l* and 27*r* which are so associated that they are inclined symmetrically with each other. This makes it possible to adjust the capacity of the hydraulic motor M over a wide range by the small angle of inclination of the motor slant plates 27*l* and 27*r*. If compared with the conventional hydraulic motor having only one motor slant plate, for example, the angle of inclination of the single motor slant plate for giving a certain changing rate to the capacity is as small as one half of the prior art. As a result, the amount of extension of the respective motor plungers 14*l* and 14*r* from the motor cylinder 12 and, accordingly, the bending moments to be received from the motor slant plates 27*l* and 27*r* are reduced together with their sliding speeds to effect improvements in smoothness and durability of the operations. Similar effects can be obtained even in the hydraulic pump P having the opposed pump plungers 9l and 9r.

In the pump cylinder 4, in the discharge strokes of the respective opposed pump plungers 9l and 9r, the oil pressure built up in the pump oil chamber 7A in between acts upon the pressure faces 8, which are formed in the stepped portion of the stepped cylinder bores 7, to press the pump cylinder 4 to the right. As a result, a high pressure is applied to the contacting faces between the support shaft 3 and the distributor end wall 12a, i.e., the receiving face of the working oil so that the oil can be prevented from leaking from the aforementioned working oil receiving face. The axial movement of the pump cylinder 4 for pressing the aforementioned oil receiving face is allowed by the sliding movement between the base side half of the input shaft 2 and the spline sleeve 5. In order to further ensure the close contact of the aforementioned working oil receiving face, the elastic force of a coil spring 49, which is borne on the inner end of the output shaft 16 through a thrust bearing 48, is applied to the left end face of the pump cylinder 4.

The fixed shaft 44 is hollow and has a short-circuit port 51 formed in its side for providing communication between the high- and low-pressure oil chambers 38h and 38l. A cylindrical clutch valve 52 for opening or closing port 51 is fitted rotatably in the hollow portion of the fixed shaft 44.

The clutch valve 52 is formed in its leading end side wall with a control groove 53 and is equipped in its base end portion with a rotary plate 54 leading to a clutch controller (not shown). The clutch-released state is established when the control groove 53 is brought into alignment with the short-circuit port 51 by the rotating operation of the rotary plate 54 thereby to fully open the short-circuit port 51; the clutch-applied state (i.e., the shown state) is established when the control groove 53 is moved from the alignment with the short-circuit port 51 thereby to fully close the port 51; and a partially clutch-applied state is established when the short-circuit port 51 is opened halfway. In the clutch-released state, more specifically, the working oil to be discharged from the discharge port 41 to the high-pressure oil chamber 38h is instantly short-circuited through the short-circuit port 51 into the low-pressure oil chamber 38l and, accordingly, into the suction port 42 to render the hydraulic motor M inoperative. In the clutch-applied state, on the other hand, the aforementioned short-circuiting of the working oil is blocked to establish the circulation of the working oil from the hydraulic pump P to the motor M thereby to effect the ordinary transmission.

In the clutch valve 52, there is built a hydraulic servo motor 57 which is operated by a pilot valve 55. The leading end portion of a servo piston 58 of the servo motor 57 is formed into a valve stem 58a having a smaller diameter than the internal diameter of the clutch valve 52 and protrudes into the high-pressure oil chamber 38h. A choke valve 59 for the discharge port 41 is attached in a swingable manner to the leading end of the protrusion of the servo piston 58. Thus, if the choke valve 59 is brought into close contact with the distributor end wall 12a by the leftward movement of the servo piston 58, the discharge port 41 can be closed. This closure is conducted when the motor slant plates 27l and 27r are erected to the upright positions to control the transmission ratio to 1:1. As a result, the pump plungers 9l and 9r are hydraulically locked so that the motor cylinder 12 can be mechanically driven from the pump cylinder 4 through the grouped pump plungers 9l and 9r and the pump slant plates 24l and 24r. As a result, the thrusts to be applied from the motor plungers 14l and 14r to the motor slant plates 27l and 27r disappear to set the respective bearings free from the loads by those thrusts.

The high-pressure oil chamber 38h is used as a hydraulic source of the hydraulic servo motor (not shown) for operating the motor slant plates 27l and 27 and the hydraulic servo motor 57 for operating the choke valve 59. For this use, an oil supply passage 60 to the hydraulic servo motor for the motor slant plates is formed through the fixed shaft 44 and opened in the high-pressure oil chamber 37h, whereas an oil supply passage 61 to the hydraulic servo motor 57 is formed through the valve stem 58a and the choke valve 59 and opened in the high-pressure oil chamber 38h, too.

Figure 2:
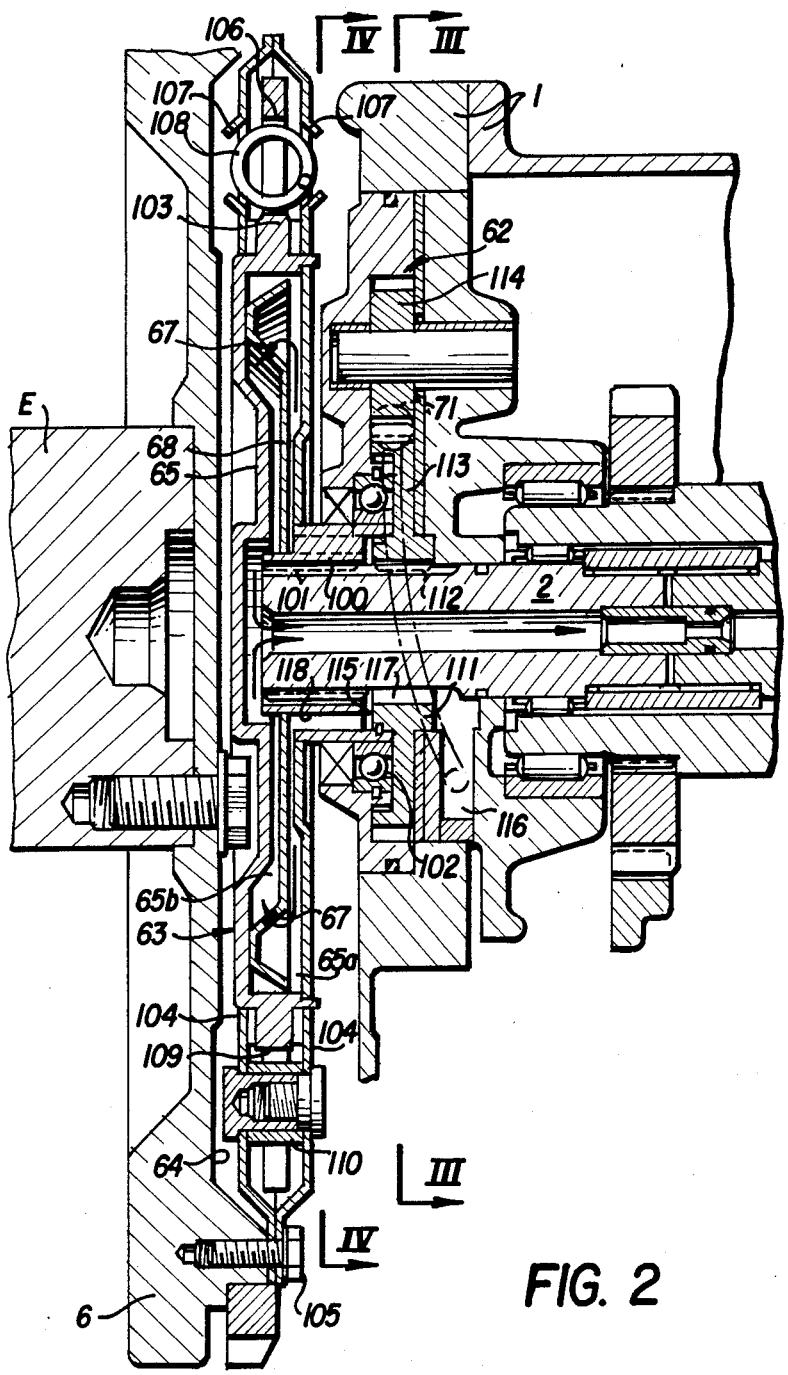
FIG. 2 is an enlarged view showing an essential portion of the same.

As clearly shown in FIG. 2, the transmission case 1 is equipped in its left end wall with a supply pump 62 for supplying the working oil to the hydraulic circuit between the hydraulic pump P and the motor M. A centrifugal oil filter 63 for cleaning the oil discharged from the pump 62 is interposed between the flywheel 6 and the input shaft 2.

The aforementioned oil filter 63 is constructed of: a flattened rotary container 65 which is accommodated in a recess 64 formed in one side of the flywheel 6; and a partition 68 which partitions the inside of the rotary container 65 into an entrance chamber 65a and an exit chamber 65b. The partition 68 is formed in its outer circumference with a plurality of communication holes 67 for providing communication between the two chambers 65a and 65b.

To the respective central portions of the rotary container 65 and the partition 68, there is fixed a boss 100 which is coupled through a spline 101 to the input shaft 2 and which is borne through a bearing 102 on the transmission case 1.

The rotary container 65 is equipped integrally with a flange 103 which protrudes in the radial direction from the central portion of the outer circumference thereof, and a pair of thrust plates 104 are so fitted rotatably in the outer circumference of the rotary container 65 as to hold that flange 103 in between. Those thrust plates 104 and 104 are so fastened to the aforementioned flywheel 6 by bolts 105 as to have their outer circumferences facing each other.

The flange 103 is formed with a plurality of apertures 106 (one of which is shown) which are arranged equidistantly in the circumference thereof, and a plurality of apertures 107 and 107 are also so formed in the two thrust plates 104 and 104 as to correspond to the foregoing apertures 106. In each group of those three apertures 106, 107 and 107, there are mounted shock-absorbing members 108 made of a spring or rubber, which are adapted to be deformed elastically in accordance with the relative rotations of the thrust plates 104 and 104 and the rotary container 65.

In order to regulate the elastic deformations of the shock-absorbing members 108, stopper members 110 connected between the two thrust members 104 and 104 are fitted in notches 109, which are formed in the flange 103, and are inserted at a predetermined spacing in the rotating direction of the thrust plates 104 and 104.

The aforementioned supply pump 62 is of the gear type and is constructed of: a drive gear 113, which has a boss 11 coupled to the input shaft 2 through a spline 112; and a driven gear 114 which meshes with the drive gear 113 so that it is driven by the same. The boss 111 of the drive gear 113 is arranged adjacent to the boss 100 of the aforementioned rotary container 65 thereby to form an annular oil passage 115 between those boses 100 and 111. Adjacent to the boss 111 of the drive gear 113, there is formed an oil chamber 116 which leads to a discharge port 71 of the supply pump 62.

Figure 3:
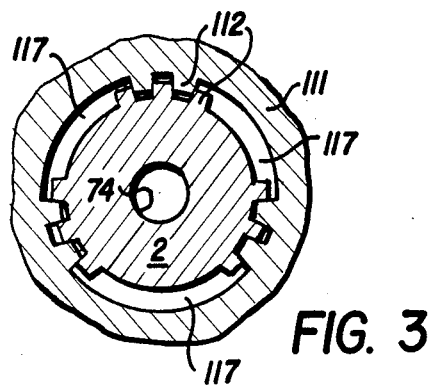
FIGS. 3 and 4 are sections taken along line III—III and IV—IV of FIG. 2.

Between the input shaft 2 and the boss 111 of the drive gear 113, as shown in FIGS. 1 and 3, a plurality of oil passages 117 are formed by partially cutting off the teeth of the spline 112 for coupling those two. Those oil passages 117 provide communication between the aforementioned oil chamber and annular oil passage 116 and 115. When the oil passages 117 are to be formed, as shown, both the teeth of the boss 111 and the teeth of the input shaft 2 splined at 112 are cut off, but alternatively only the teeth of one of the same may be cut off.

Figure 4:
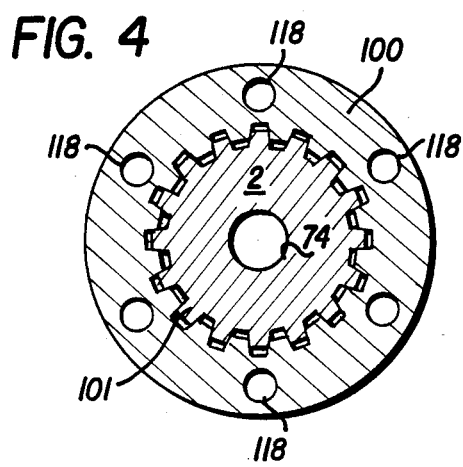

As shown in FIGS. 1 and 4, moreover, the boss 100 of the rotary container 65 is formed with a plurality of oil ports 118, which provide communication between the aforementioned annular oil passage 115 and the entrance chamber 65a of the rotary container 65.

The exit chamber 65b of the rotary container 65 communicates with an oil passage 74 which is formed in the central portion of the input shaft 2. This oil passage 74 communicates with the aforementioned discharge port 41 through a check valve 75 and with the aforementioned low-pressure oil chamber 38 through an oil chamber 77 and a check valve 76 which are interposed between the pump cylinder 4 and the motor cylinder 12.

Next, the forward and reverse gear mechanism G will be described in the following. Between the output shaft 16 of the hydraulic motor M and the well-known differential gear mechanism D coupled to drive wheels (not shown), a counter shaft 78 is supported rotatably in the transmission case 1 and extends in parallel with the output shaft 16. First and second drive gears $79_1$ and $79_2$ are fixed in juxtaposition to each other on the output shaft 16 and there are rotatably mounted on the counter shaft 78 a first driven gear $80_1$, which is in meshing engagement with the first drive shaft $79_1$, and a second driven shaft $80_2$ which meshes with the second drive shaft $79_2$ through an intermediate gear 81. The two driven gear $80_1$ and $80_2$ are equipped integrally at their opposed portions with drive clutch ring gears $82_1$ and $82_2$, between which is arranged a drive clutch ring gear 83 fixed on the counter shaft 78. This clutch ring gear 83 can be connected selectively to the drive clutch ring gear $82_1$ and $83_2$ through an annular clutch member 84 engaging therewith at all time. A shift fork 85 which is actuated by a hydraulic cylinder (not shown) is provided to operate the clutch member 84. Moreover, the counter shaft 78 has fixed thereon a differential pinion 87, which is in meshing engagement with the differential side-gear 88 of the differential gear mechanism D, at its left end portion and a parking gear 89 at its right end portion.

Thus, while the hydraulic motor M is rotating, the clutch member 84 is moved to the left, as indicated by solid lines, to connect the drive clutch ring gear 83 to the drive clutch ring gear $82_1$. Then, the rotating torque of the output shaft 16 is transmitted through the first drive gear $79_1$, the first drive gear $80_1$, the clutch ring gear 83, the counter shaft 78, the pinion 87 and the side-gear 88 in the recited order to drive the differential gear mechanism D in the forward direction of a vehicle. If, on the contrary, the clutch member 84 is moved to the right, as indicated by broken lines, to connect the driven clutch ring gear 83 to the drive clutch ring gear $82_2$, the rotating torque of the output shaft 16 is transmitted through the second drive gear $79_2$, the intermediate shaft 81, the second driven gear $80_2$, the clutch ring gear 83, the counter shaft 78, the pinion 87 and the side-gear 88 in the recited order to drive the differential gear mechanism D in the reverse direction of the vehicle.

Next, the operations of the present embodiment will be described in the following.

While the engine is in the normal run, the output torque of the crankshaft E is transmitted to the input shaft 2 of the transmission T through a transmission path composed of the flywheel 6, the two thrust plates 104 and 104, the shock-absorbing members 108 and the rotary container 65. When the engine is braked by the running vehicle, a reverse load is transmitted through the aforementioned transmission path to the crankshaft E.

If, in either case, torque fluctuations occur between the flywheel 6 and the input shaft 2, moreover, the shock-absorbing members 108 are elastically deformed to establish between the thrust plates 104 and 104 and the rotary container 65 relative rotations, by which the aforementioned torque fluctuations are absorbed.

The input shaft 2 continuously drives the supply pump 62 at all times during its rotation, and the supply pump 62 discharges the oil, which is sucked from an oil sump, under a predetermined pressure from the discharge port 71 to the oil chamber 116. The oil thus discharged into the oil chamber 116 flows through the oil passage 117, the annular oil passage 115 and the oil ports into the rotary counter 65 and is centrifugally cleared of foreign substances such as chips or worn powder while it is flowing from the entrance chamber 65a to the exit chamber 65b in a manner to bypass the partition 68. The foreign substances thus filtered deposit on the inner circumference of the rotary container 65.

The oil thus cleaned through the rotary container 65 fills up the oil passage 74 and the oil chamber 77 to lubricate the bearings $25l$ and $26l$; and $25r$ and $26r$ of the pump slant plates $24l$ and $24r$. If the working oil leaks from the hydraulic closed circuit between the hydraulic pump P and the motor M, this leakage is supplied by the flow into the discharge port 4 and the low-pressure oil chamber $38l$ through the check valve 75 or 76.

As has been described hereinbefore, according to the present invention, there is interposed between the rotary container connected to the input shaft and the thrust plates fitted rotatably on the outer circumference of the container, the torque absorbent member which is adapted to be deformed in response to the relative rotations of the two, and the thrust plate is connected to the flywheel. As a result, the torque fluctuations occurring between the engine and the transmission can be absorbed by both the elastic deformations of the torque absorbing member and the accompanying relative rotations between the thrust plates and the rotary container. As a result, the vibrations can be prevented from occurring due to the torque fluctuations so that the power transmission between the engine and the transmission can be smoothened. Since the rotary container having the relatively large diameter performs a function to hold the absorbing member, moreover, this member can be held at a sufficient spacing in the radial direction from the input shaft without using any special holding member. As a result, the construction can be simplified, and the absorbing member can have its load lightened to enhance its durability.

It is readily apparent that the above-described apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A hydraulic transmission having an input shaft connected to a flywheel of an engine through a rotary container of a centrifugal oil filter and a shock absorber for absorbing torque fluctuation between the flywheel and transmission, said centrifugal oil filter and shock absorber comprising, a rotary filter container having spaced outer walls joined at their outer circumference by a flange to form a liquid tight chamber between said walls, at least one of the outer walls of said centrifugal oil filter rotary container being splined to said input shaft of said hydraulic transmission, said flange having a plurality of apertures, equally spaced circumferentially around said flange, a pair of thrust plates extending circumferentially around said flange and extending radially outward therefrom, said thrust plates being mounted at their radially outer ends to said flywheel for rotation therewith and at their radially inner ends being axially spaced from each other and straddling said flange, said axially spaced thrust plates, at the portion straddling said flange, having a plurality of apertures, equal in numbers and equal in spacing to the apertures circumferentially around said flange, said apertures in said thrust plates and said flanges being aligned, and an elastic shock absorbing member in each of said equally spaced and aligned apertures and extending through said apertures for transmitting torque between said thrust plates and said flange, said flange having a plurality of notches intermediate said flange apertures, said thrust plates having stopper members fixed to said thrust plates and extending through said notches, said notches being longer circumferentially of said flange than the circumferential length of said stoppers, said stoppers and said notches limiting the elastic deformation of said elastic shock absorbing members as torque fluctuations are absorbed thereby.

* * * * *